United States Patent [19]
Bernasconi et al.

[11] Patent Number: 6,158,018
[45] Date of Patent: Dec. 5, 2000

[54] INTEGRATED CIRCUIT INCLUDING PATCHING CIRCUITRY TO BYPASS PORTIONS OF AN INTERNALLY FLAWED READ ONLY MEMORY AND A METHOD THEREFORE

[75] Inventors: Eric Bernasconi, Biot; Didier Harnay, Valbonne, both of France

[73] Assignee: Philips Semiconductor, Inc., Sunnyvale, Calif.

[21] Appl. No.: 08/978,074

[22] Filed: Nov. 25, 1997

[51] Int. Cl.[7] .................................................. B06F 11/00
[52] U.S. Cl. ................................................ 714/8; 714/54
[58] Field of Search .......................... 714/5, 8, 42, 53, 714/54, 719

[56] References Cited

U.S. PATENT DOCUMENTS

| | | | |
|---|---|---|---|
| 4,028,684 | 6/1977 | Divine et al. | 340/172.5 |
| 4,751,703 | 6/1988 | Picon et al. | 371/10 |
| 4,831,517 | 5/1989 | Crouse et al. | 364/200 |
| 5,155,847 | 10/1992 | Kirouac et al. | 395/600 |
| 5,619,698 | 4/1997 | Lillich et al. | 395/710 |
| 5,623,665 | 4/1997 | Shimada et al. | 395/182.03 |
| 5,796,972 | 8/1998 | Johnson et al. | 395/384 |
| 5,796,974 | 8/1998 | Goddard et al. | 395/387 |
| 5,799,144 | 8/1998 | Mio | 395/183.14 |
| 5,813,043 | 9/1998 | Iles et al. | 711/163 |
| 5,901,225 | 5/1999 | Ireton et al. | 380/4 |

*Primary Examiner*—Robert W. Beausoliel, Jr.
*Assistant Examiner*—Scott T. Baderman

[57] ABSTRACT

An improved Integrated Circuit (IC) device is delineated comprising, in combination, an IC including an embedded Digital Signal Processor (DSP), an embedded Random Access Memory (RAM), an embedded Read Only Memory (ROM) having at least one portion thereof which is flawed and embedded patching circuitry having as inputs the current DSP program address and at least one break address wherein each break address corresponds to a separate flawed portion of the embedded ROM. The patching circuitry supplies data stored in flawless portions of the ROM to the DSP until the current DSP program address matches a break address indicating that the next portion of the embedded ROM is flawed. In place of the data stored in the flawed portion of the embedded ROM, the patching circuitry supplies corrected data stored in the embedded RAM to the DSP, and after this corrected data is supplied, data transfer to the DSP from the remaining unflawed portions of the embedded ROM is resumed. If flawed portions in the embedded ROM are subsequently detected, the aforementioned process repeats.

17 Claims, 6 Drawing Sheets

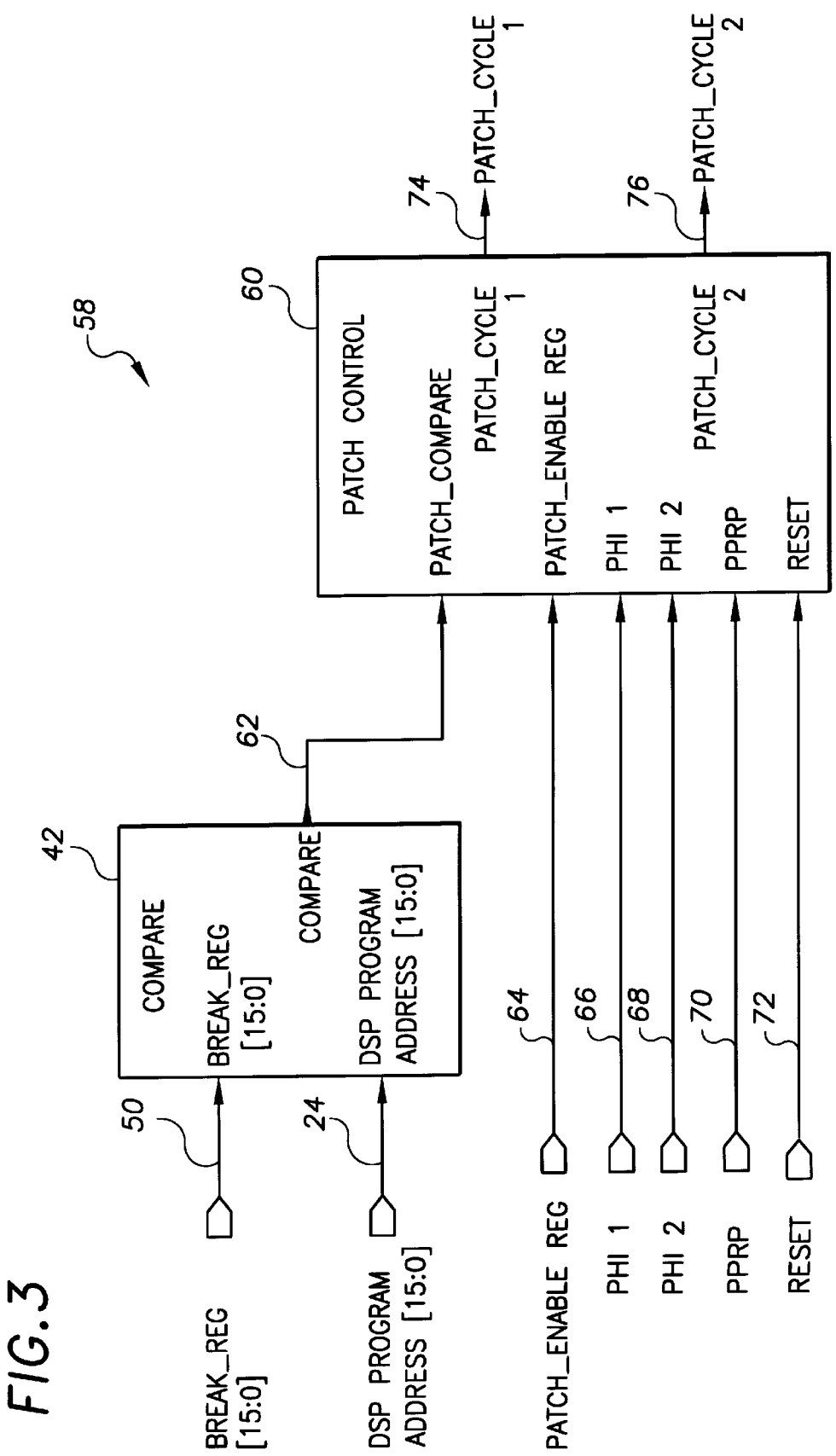

INTEGRATED CIRCUIT INCLUDING PATCHING CIRCUITRY TO BYPASS PORTIONS OF AN INTERNALLY FLAWED READ ONLY MEMORY AND A METHOD THEREFORE

BACKGROUND OF THE INVENTION

1. Field of the Invention

This invention is in the field of Integrated Circuits (hereafter "ICs") and methods of operation therefore and, more particularly, is an Integrated Circuit (hereafter "IC") having an embedded Read Only Memory (hereafter "ROM") having one or more portions thereof with flawed software stored therein, and embedded patching circuitry to bypass the flawed portions of the ROM and a method of operation therefore.

2. Description of the Related Art

Those skilled in the art are familiar with the use of IC's. In many applications, an IC will have a Digital Signal Processor (hereafter "DSP") core embedded therein for processing data. These DSP cores usually have their software program also embedded "on chip," i.e., on the IC. More specifically, during the fabrication of the IC, a DSP's software program is typically stored into ROM embedded in the IC. Sometimes, during post-production quality assurance checks of the IC, problems are detected in the DSP's software program stored in the embedded ROM. These problems could be the result of the ROM itself, the software stored therein, a combination of these two, or some other potential cause—what's important is that the DSP's software program stored in the embedded ROM is not fully usable by the DSP. At this point there are several options available to avert the flaw.

One option is simply to re-fabricate the IC in order to correct the flaw in the embedded ROM storing the DSP's program software, but obviously this alternative expands overall production time and costs, and therefore it is not desirable. Another option is to make an IC having an embedded DSP, but using an external, rather than an embedded, "on chip" ROM that stores the DSP's program software. Using this approach, if a problem is detected in the DSP's software stored in the external ROM, one can simply make a new external ROM, as opposed to having to remake the entire IC if the DSP's flawed program software were stored in ROM embedded in the IC. This approach has several inherent disadvantages though. Specifically, by storing the DSP's program software in an external ROM, as opposed to one embedded on the IC, longer data access time results in system speed degradation. Also, this approach requires the use of two ICs, namely one having the embedded DSP and another having the external ROM, thereby wasting system space. Therefore this approach, because of its requirement of an additional IC and its slower access time, is unacceptable.

A third approach requires the implementation of a large Random Access Memory (hereafter "RAM") embedded in an IC also having an embedded DSP. This technique has some advantages. First, embedded RAM permits high speed data access by the DSP. Additionally, before running the IC, one can download corrected DSP program software into the large embedded RAM, thereby obviating the need to remanufacture the IC. Moreover, this approach, unlike the previous one, requires only a single IC; however, there are significant disadvantages associated with this technique too. In particular, although data access time of embedded RAM is relatively fast as compared to that for embedded ROM, some time is unnecessarily wasted in the initial loading of the DSP's program software into the embedded RAM. Also, a large embedded RAM takes up much more space on the IC than does embedded ROM, and therefore, this approach also is undesirable.

Therefore, there existed a need to provide an improved IC device and a method of operation therefore, which eludes the disadvantages of prior IC devices. Such an improved IC device would include an embedded DSP, an embedded ROM storing the DSP's program software having one or more flaws therein, a small embedded RAM, and patching circuitry for substituting corrected portions of the DSP's program software loaded into the small embedded RAM for the flawed portions in the embedded ROM.

SUMMARY OF THE INVENTION

An object of the present invention is to provide an improved IC device including patching circuitry to bypass flawed data stored in an embedded ROM and a method of operation therefore.

Another object of the present invention is to provide a method for operating an improved IC device without having to remanufacture the IC device because it includes an embedded ROM storing data with one or more flawed portions.

Still another object of the present invention is to provide an improved IC device including an embedded DSP and patching circuitry to bypass flawed DSP program software stored in an embedded ROM and a method of operation therefore.

A further object of the present invention is to provide an improved IC device including an embedded DSP, an embedded ROM having the DSP's program software stored therein wherein one or more portions thereof are flawed, a small embedded RAM having corrected portions of DSP program software loaded therein, and patching circuitry to deliver to the DSP the flawless portions of the DSP's program software stored in the embedded ROM while substituting the corrected portions of the DSP program software stored in the embedded RAM for the flawed portions stored in the embedded ROM and a method of operation therefore.

BRIEF DESCRIPTION OF THE PREFERRED EMBODIMENTS

According to one embodiment of the present invention, an Integrated Circuit (IC) device is disclosed comprising, in combination, an IC including an embedded Digital Signal Processor (DSP), an embedded Random Access Memory (RAM), an embedded Read Only Memory (ROM) having at least one portion thereof which is flawed, and patching circuitry embedded in the IC and having as inputs a current DSP program address and at least one break address wherein each break address corresponds to a separate flawed portion of the embedded ROM. The patching circuitry includes at least one patch module, and each patch module includes a comparator coupled to a corresponding patch control module. Each comparator shares a common input line providing the current DSP program address; however, each comparator has their own dedicated break address input corresponding to a separate flawed portion of the embedded ROM, and each comparator has an output coupled as an input to their corresponding patch control module. A comparator's output will assert when the comparator's break address input matches the current DSP program address input. Also, each patch control module has its own patch enable input, and a patch control module initiates a patch sequence when the patch control module is enabled and its input from its corresponding comparator is asserted. The IC device further includes patch priority means coupled to each output of each patch module for controlling which patch module is enabled. Moreover, the IC device also includes a patch manager module coupled to each output of each patch module, and the patch manager module has a separate branch address input for each patch module. Each branch address input provides to the patch manager module an address corresponding to a location in the embedded RAM which is a starting point of a block of corrected software for use by the embedded DSP in place of flawed software stored in a flawed portion of the embedded ROM. The patch manager module outputs a branch op code followed by a branch address to the DSP in response to a patch control module initiating the patch sequence, and the branch address comes from a branch address input corresponding to an enabled patch module.

According to another embodiment of the present invention, a method of operating an Integrated Circuit (IC) device is disclosed comprising the steps of providing an IC including an embedded Digital Signal Processor (DSP), an embedded Random Access Memory (RAM), and an embedded Read Only Memory (ROM) having at least one portion thereof which is flawed, and providing patching circuitry embedded in the IC and having as inputs a current DSP program address and at least one break address wherein each break address corresponds to a separate flawed portion of the embedded ROM. This method further comprises the steps of comparing the current DSP program address with a break address, and detecting a match between the current DSP program address and the break address. Additionally, the method includes the steps of supplying data stored in the embedded ROM to the embedded DSP until detection of a match, and providing a branch op code followed by a branch address to the embedded DSP in response to the detection of a match. The branch address corresponds to a location in the embedded RAM which is a starting point of a block of corrected software for use by the embedded DSP in place of flawed software stored in a flawed portion of the embedded ROM. This method also comprises the steps of supplying the corrected software to the embedded DSP after the step of providing a branch op code followed by a branch address to the embedded DSP, and supplying data to the embedded DSP from a portion of the embedded ROM located downstream of the flawed portion thereof after the step of supplying corrected software to the embedded DSP. The step of supplying data to the embedded DSP from the portion of the embedded ROM located downstream of the flawed portion thereof comprises the additional step of providing at the end of the corrected software a jump op code followed by an address to jump to corresponding to the portion in the embedded ROM located downstream of the flawed portion thereof. This method additionally comprises the step of changing the break and branch addresses after the step of supplying the corrected software, wherein a new break address corresponds to a starting location of another flawed portion of the embedded ROM and a new branch address corresponds to location in the embedded RAM where a block of corrected software begins to be used by the embedded DSP in place of the other flawed portion of the embedded ROM, thereby permitting a plurality of substitutions of corrected software for a plurality of flawed portions in the embedded ROM. Note that the step of changing the break and branch addresses may be performed by a portion of the device which includes the IC, where this portion is outside of the IC. Alternatively, the step of changing the break and branch addresses may be done via the additional step of providing the corrected software with instructions directing the embedded DSP to change the break and branch addresses.

The foregoing and other objects, features, and advantages of the invention will be apparent from the following, more particular, description of the preferred embodiments of the invention, as illustrated in the accompanying drawings.

DESCRIPTION OF THE PREFERRED EMBODIMENTS

Figure 1:
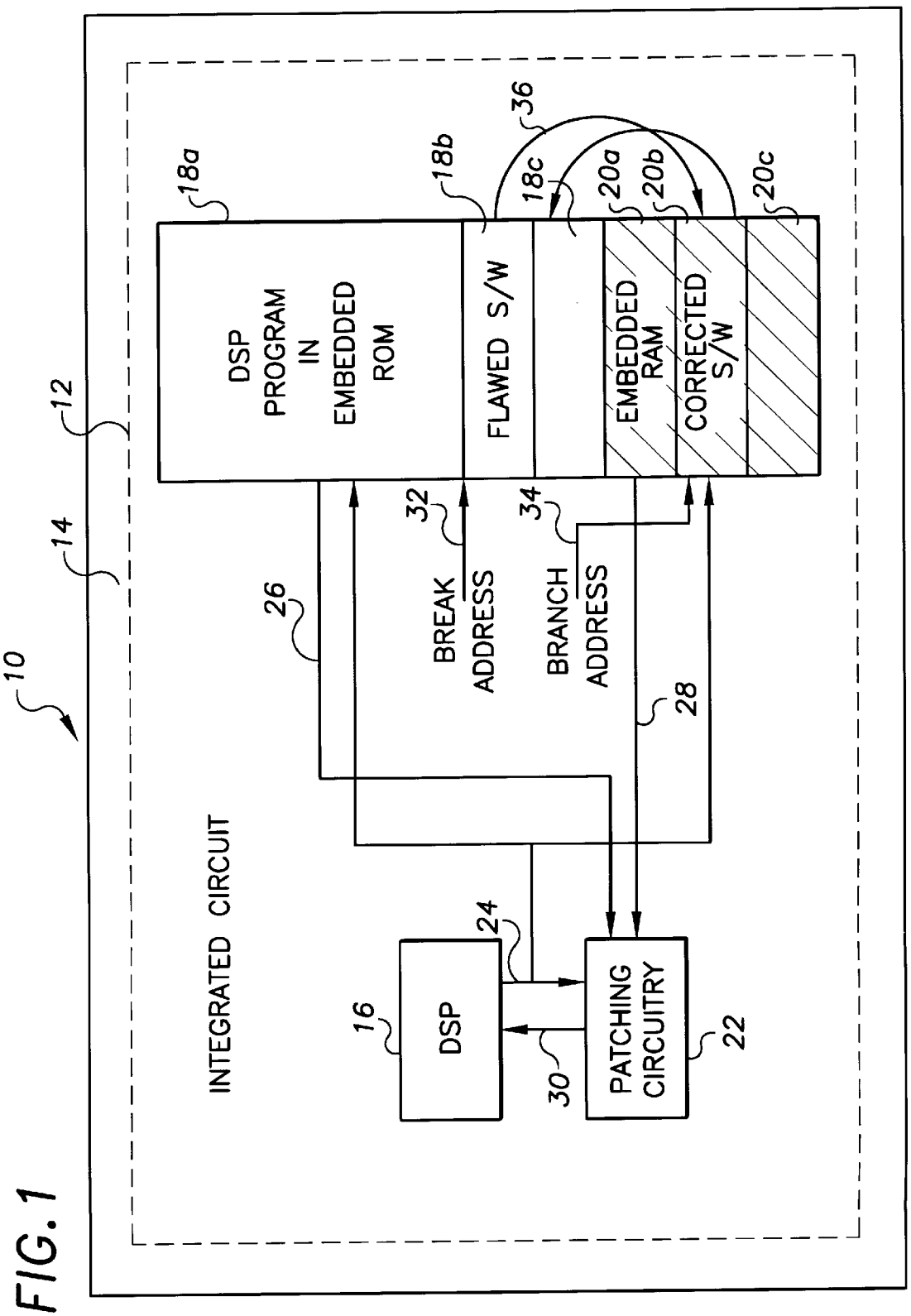
FIG. 1 is a conceptual diagram of a system having an integrated circuit device with, among other things, an embedded ROM having stored software including a flawed portion.

Referring to FIG. 1, a conceptual diagram of a system is shown and generally designated by reference number 10. The system 10 includes, among other things, an IC device (hereafter referred to as "IC," "device," or "IC device") represented by the dashed-line block 12, and its internals. It is important to emphasize again that FIG. 1 is a conceptual diagram. For example, it has been stated that system 10 includes the IC 12, among other things. The phrase "other things" refers to device elements and components located but not shown in area 14, i.e., that portion of system 10 outside of IC 12. Those skilled in the art of electrical engineering understand that an electronic system such as system 10 may include a wide variety of different elements in the area labeled 14. What those "other things" or elements might be is not of major significance for the task of disclosing the invention here, and therefore they are not specifically identified. Nonetheless, area 14 would include, at a minimum, an element such as a microcontroller (not shown) or the like. Such a microcontroller would have connections to permit communication with IC 12, and such connections would be well known to those skilled in the art.

Thus, FIG. 1 can be seen as a conceptual diagram in that elements outside of IC 12, which are not the focus of the disclosure here, are not explicitly shown or described. Moreover, elements within IC 12 are shown in a somewhat simplified presentation. For example, the internal elements of IC 12 are necessary for the invention here; however, other internal elements well known to those skilled in the art could be added within IC 12, if desired. Additionally, the communication lines or busses running between the internal elements of IC 12 are shown in a simplified manner for clarity of presentation, and those skilled in the art understand that more comprehensive interconnecting communication lines or buses could be implemented in any one of a number of different manners well known to those skilled in the art. In other words, the interconnecting communication lines or buses of FIG. 1 are merely illustrative of one possible manner of performing basic inter-element communication, as those skilled in the art will recognize that other more complex and comprehensive arrangements of interconnecting communication lines are possible. Such alternative arrangements might even include additional interconnecting lines of communication, as those skilled in the art recognize that typically in an IC such as IC 12 there are many more interconnecting lines of communication forming complex arrangements of buses or lines; however, showing all possible interconnecting lines of communication here would obscure the goal of clearly presenting the focus of the invention. Accordingly, while FIG. 1 is important for helping to achieve the goal of disclosing the invention here, one can now see more clearly that this Figure is simplified in order to show some of the more fundamental aspects of the invention.

With that general introduction, and still proceeding with reference to FIG. 1, the IC device comprises, in combination, an IC 12 including an embedded DSP 16, an embedded RAM 20 (i.e., 20a–c), an embedded ROM 18 (i.e., 18a–c) having at least one portion 18b thereof which is flawed, and patching circuitry 22 embedded in the IC 12. The patching circuitry 22 includes as inputs a current DSP program address provided on bus 24 and at least one break address (e.g., see FIG. 3 where line 50 provides at least one break address) wherein each break address corresponds to a separate flawed portion 18b of the embedded ROM 18. Note that the embedded ROM 18 (hereafter more simply referred to as the "ROM") is shown in three sections. In particular, section 18a has accurate DSP program software stored thereon, while another section 18b has flawed DSP program software stored thereon, and yet another section 18c has additional accurate DSP program software stored thereon. Similarly, the embedded RAM 20 (hereafter more simply referred to as the "RAM") is shown in three sections. Sections 20a and 20c represent RAM with or without data of interest stored thereon; however, section 20b has data of interest, namely, corrected DSP program software stored thereon. More specifically, the software stored in section 20b corresponds to a corrected version of the flawed DSP program software stored in 18b. It should be pointed out that the ROM 18 is only shown with one flawed portion 18b; however, in practice, there may be more than one flawed portion like 18b in ROM 18, and the IC's RAM 20 will have an equal number of corresponding portions of corrected DSP program software like 20b. Note that the flawed and corrected portions of DSP program software could be located anywhere within the ROM 18 and the RAM 20, respectively. Also, note that while the ROM 18 and the RAM 20 have been referred to as storing data, the general term "data" refers to DSP program software, which includes DSP instructions and/or data to be processed by the DSP 16; however, other types of instructions and/or data well known to those skilled in the art may be implemented, if desired.

Thus, the ROM 18 can have multiple flawed sections like 18b with a corresponding number of corrected DSP program software sections stored in RAM 20, like section 20b; however, there's one subtlety of note which will be explained by way of example. Assume that the ROM 18 had three separate flawed portions like 18b. Then, RAM 20 would require three separate corrected DSP program software portions like 20b, but while all three flawed portions (each like section 18b of ROM 18) exist at the same time in the ROM 18, the same is not necessarily the case with the three corrected DSP program software portions of the RAM 20. Specifically, on one hand, it is possible that RAM 20 simultaneously includes three or more separate sections each storing corrected DSP program software corresponding to the three or more separate flawed portions of ROM 18. Alternatively, it is also possible that RAM 20 does not simultaneously include three or more separate sections each storing corrected DSP program software corresponding to the three or more separate flawed portions of ROM 18. This second alternative really means that the RAM 20 could have three or more separate sections each storing corrected DSP program software corresponding to the three or more separate flawed portion of ROM 18; however, the three corrected sections in RAM 20 could be loaded one section at a time, or one section followed by two, or some other combination other than all sections simultaneously loaded into the RAM 20. The specifics of this later alternative of loading corrected DSP program software into the RAM 20 will become apparent in light of the discussion of the operation of the device 12.

Again with respect to FIG. 1, a bus 24 provides the current DSP program address from the embedded DSP 16 (hereafter more simply referred to as "DSP") to the patching circuitry 22, the ROM 18, and the RAM 20. Additionally, DSP program software stored in the ROM 18 is provided via bus 26, the patching circuitry 22, and bus 30 to the DSP 16. Similarly, corrected DSP program software stored in the RAM 20 such as section 20b of the RAM 20 is provided via bus 28, the patching circuitry 22, and bus 30 to the DSP 16.

The line 36 represents a branch from the beginning of a block of flawed DSP program software stored in section 18b of the ROM 18 to the beginning of a block of corrected DSP program software stored in section 20b of the RAM 20. After the corrected DSP program software from section 20b is delivered to the DSP 16 over bus 28, the patching circuitry 22, and bus 30, a program op code causes a jump back from the end of the block of corrected DSP program software in section 20b of the RAM 20 to the remainder of good DSP program software in section 18c of the ROM 18. This jump back to the ROM 18 is represented by the line 38. The lines 36 and 38 jumping to and then away from the corrected DSP program software in section 20b of the RAM 20 are not physical connections, but rather are merely lines indicating that the DSP 16 is first getting its program software from the ROM 18 in section 18a, then from the RAM 20 in section 20b, and then from the ROM 18 in section 18c.

The lines labeled break address 32 and branch address 34 are also not physical connections to the ROM 18 and RAM 20. These lines 32 and 34 are merely symbolic. In particular, line 32 represents an address position in ROM 18 where a flawed portion 18b of DSP program software begins, and at that point, a branch to corrected DSP program software in section 20b is performed. The line 34 represents an address position in RAM 20 where the corrected portion 20b of DSP program software begins. Finally, it should be mentioned here that both the break address on line 32 and the branch address on line 34 may be changed. For example, if the ROM 18 had more than one flawed portion of DSP program software like section 18b, then after the first break address was detected and the corrected DSP program software beginning at the first branch address was used, the break and branch addresses would have to be changed to point to the next position of flawed and corrected DSP program software, respectively. The manner in which this action is carried out will be discussed with respect to the operation of the device 12.

Figure 2:
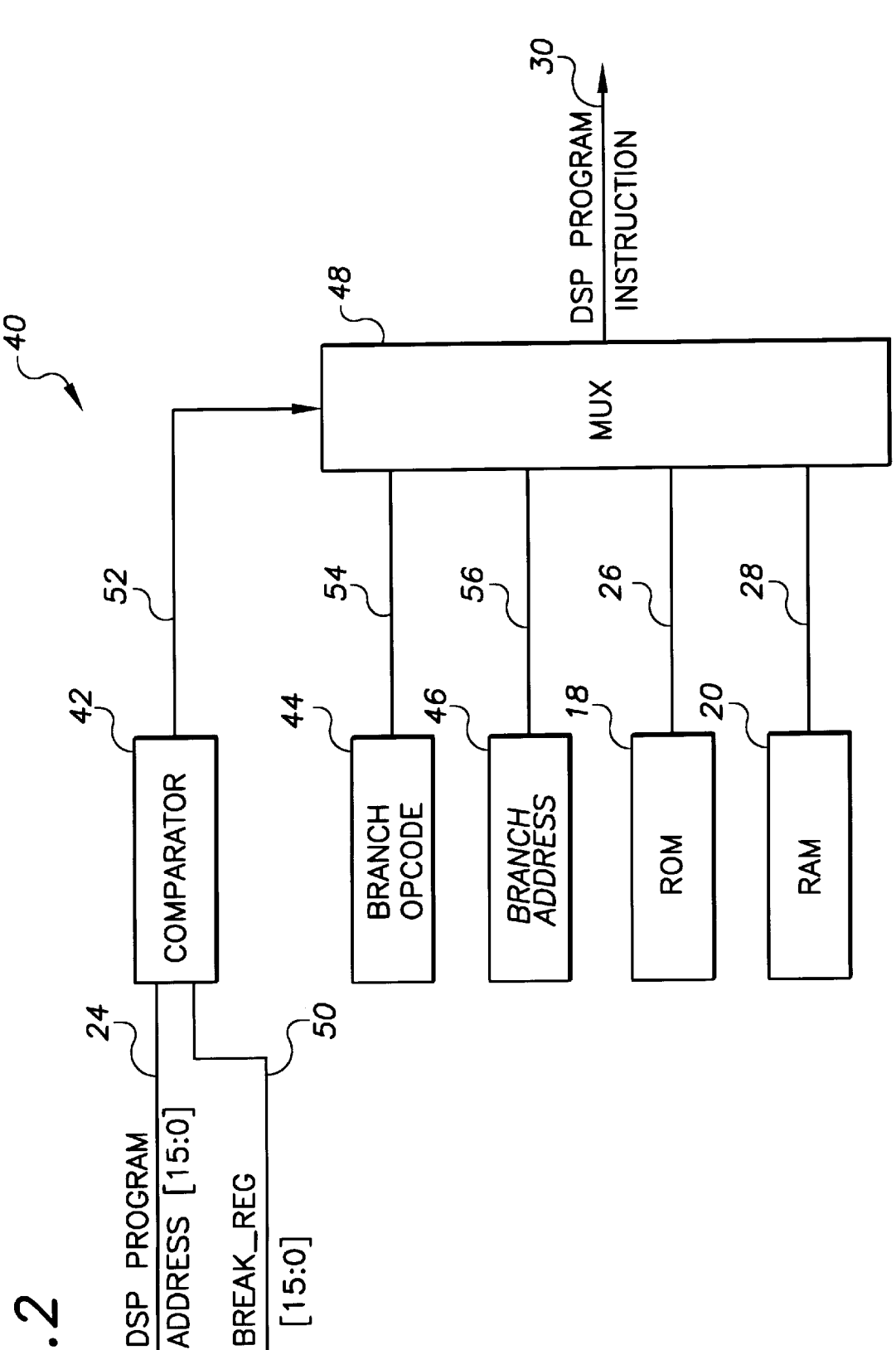
FIG. 2 is a conceptual diagram depicting a portion of the patching circuity, and the embedded RAM and ROM of FIG. 1.

Now referring to FIG. 2, a conceptual diagram generally designated by reference number 40 is shown depicting a portion of the patching circuity 22, as well as the RAM 20 and ROM 18 of FIG. 1. A comparator well known to those skilled in the art is shown and designated by reference number 42. The comparator 42 has as inputs the current DSP program address on bus 24 and a break address on line 50.

When the comparator 42 detects a match between its two aforementioned inputs, it outputs a signal indicating a match on line 52 to multiplexor 48, which is also well known to those skilled in the art. A branch op code block 44 is also coupled to multiplexor 48 through line 54. Similarly, a branch address block 46 is coupled to multiplexor 48 through line 56. Additionally, the ROM 18 and RAM 20 are coupled to the multiplexor 48 via buses 26 and 28, respectively. The multiplexor 48 outputs data to the DSP 16 (see FIG. 1) over bus 30.

Like FIG. 1, FIG. 2 is primarily a conceptual diagram, meaning that while it does show some important aspects of the invention by itself, it needs to be considered in light of the other Figures for a more complete understanding of the invention. Of particular note, only a portion of the patching circuitry 22 (see FIG. 1) is shown here. Specifically, the comparator 42, the branch op code block 44, the branch address block 46, the multiplexor 48, and lines 52, 54, and 56 are part of the patching circuitry 22. Other portions of the patching circuitry 22 must be seen from FIGS. 3 and 4; however, the ROM 18 and RAM 20 are distinct from the patching circuitry 22. The multiplexor 48 has been stated to be part of the patching circuitry 22, and this is true; however, more explanation is required. In particular, in the preferred embodiment, the multiplexor 48 is fully within the patching circuitry 22. In an alternative embodiment, which performs substantially identically to the preferred embodiment, only part of the multiplexor 48 is actually located within the patching circuitry 22 while the remainder of the multiplexor 48 is located within the on chip memory (i.e., the ROM 18 and RAM 20). In this alternative embodiment, that portion of the multiplexor 48 within the patching circuitry 22 would, in response to the detection of a match from the comparator 42, multiplex the branch op code from block 44 followed by the branch address from block 46 to the DSP 16. The remainder of the multiplexor 48 within the collective on chip memory would multiplex data from the ROM 18 and RAM 20 when required by the DSP 16. Such arrangements of the multiplexor 48 are well known to those skilled in the art.

Figures 1, 4:
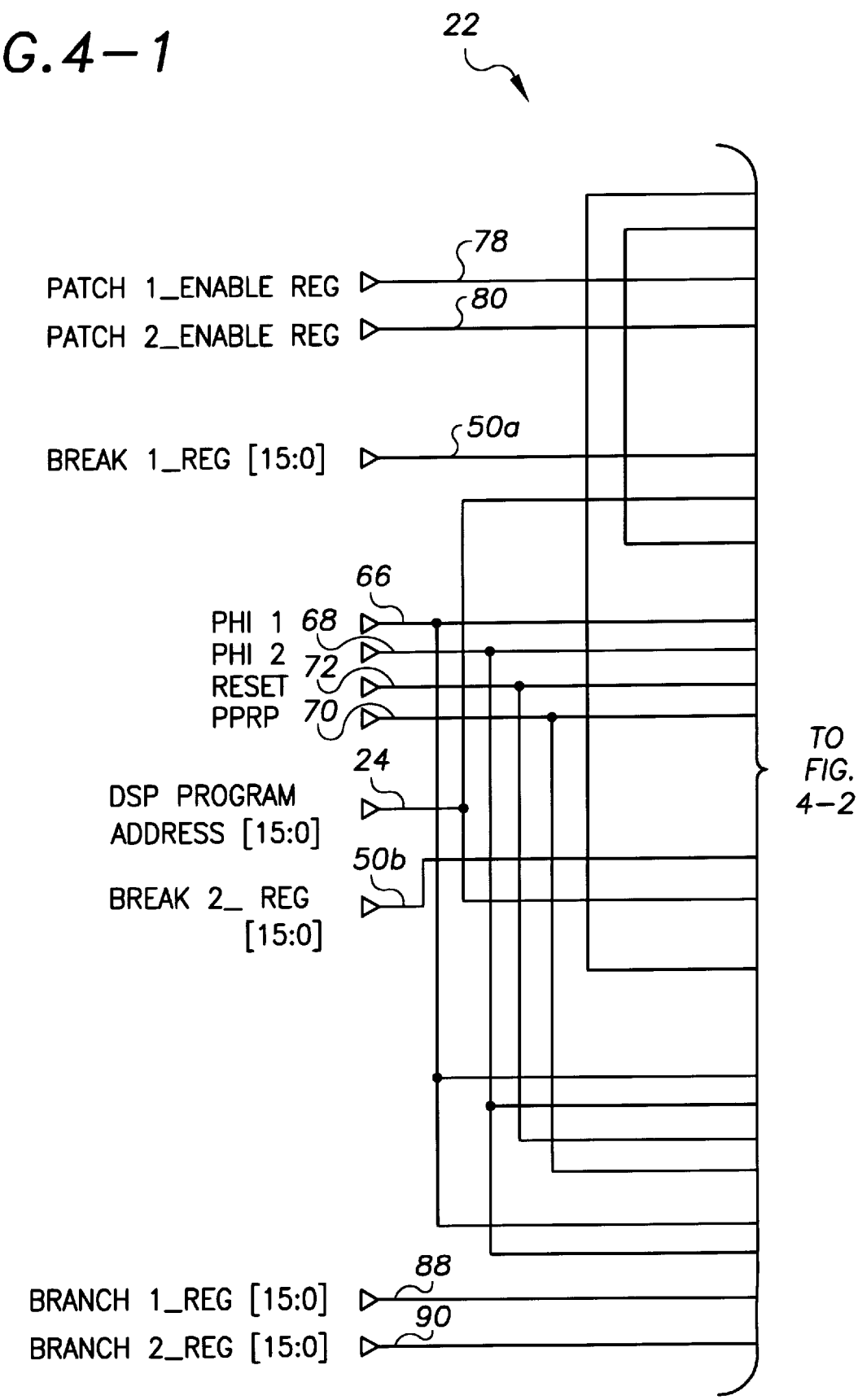
FIG. 4 is a simplified electrical schematic of the internal component blocks forming the patching circuitry of FIG. 1.
Figures 2, 4:
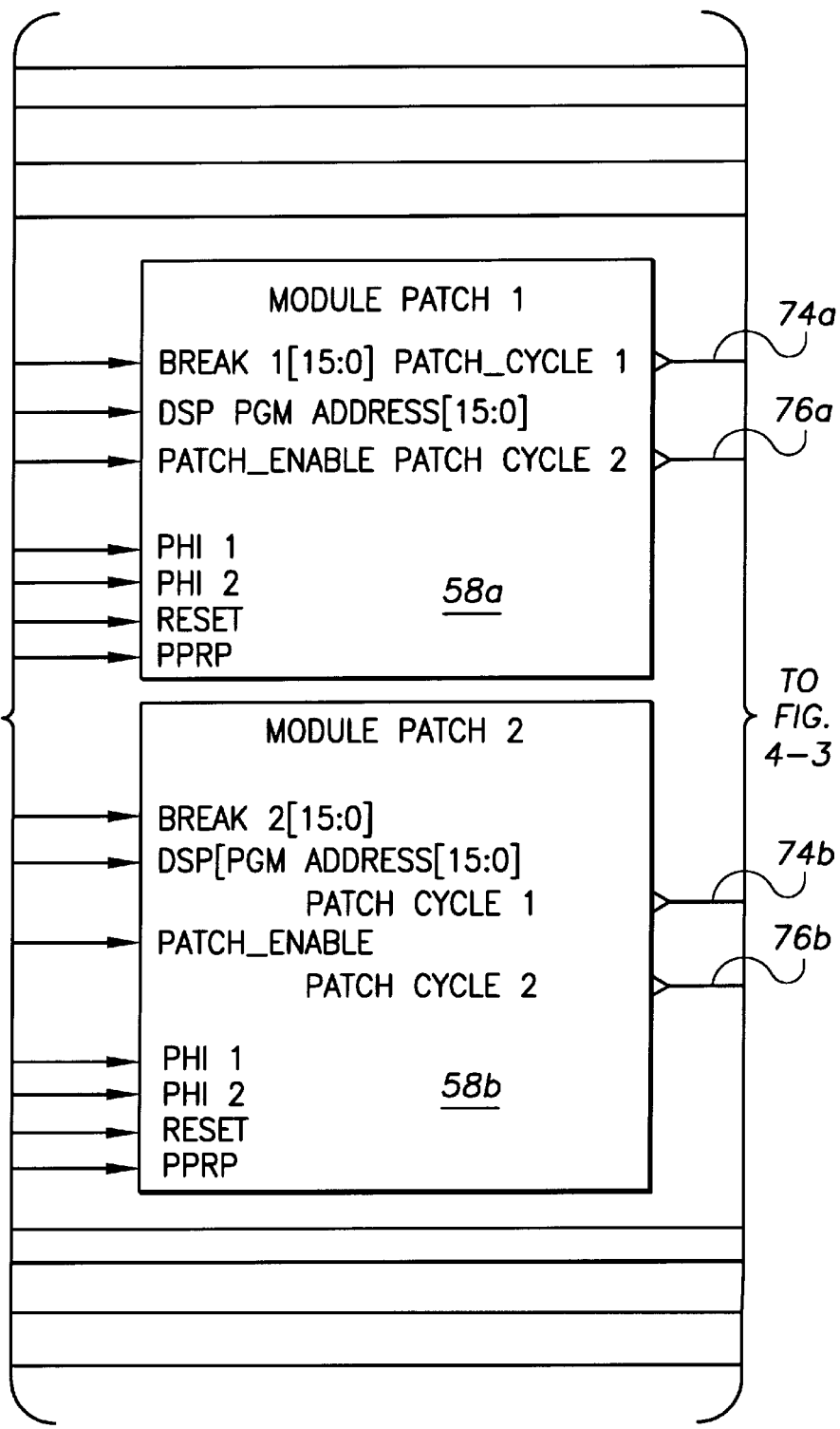
Figures 3, 4:
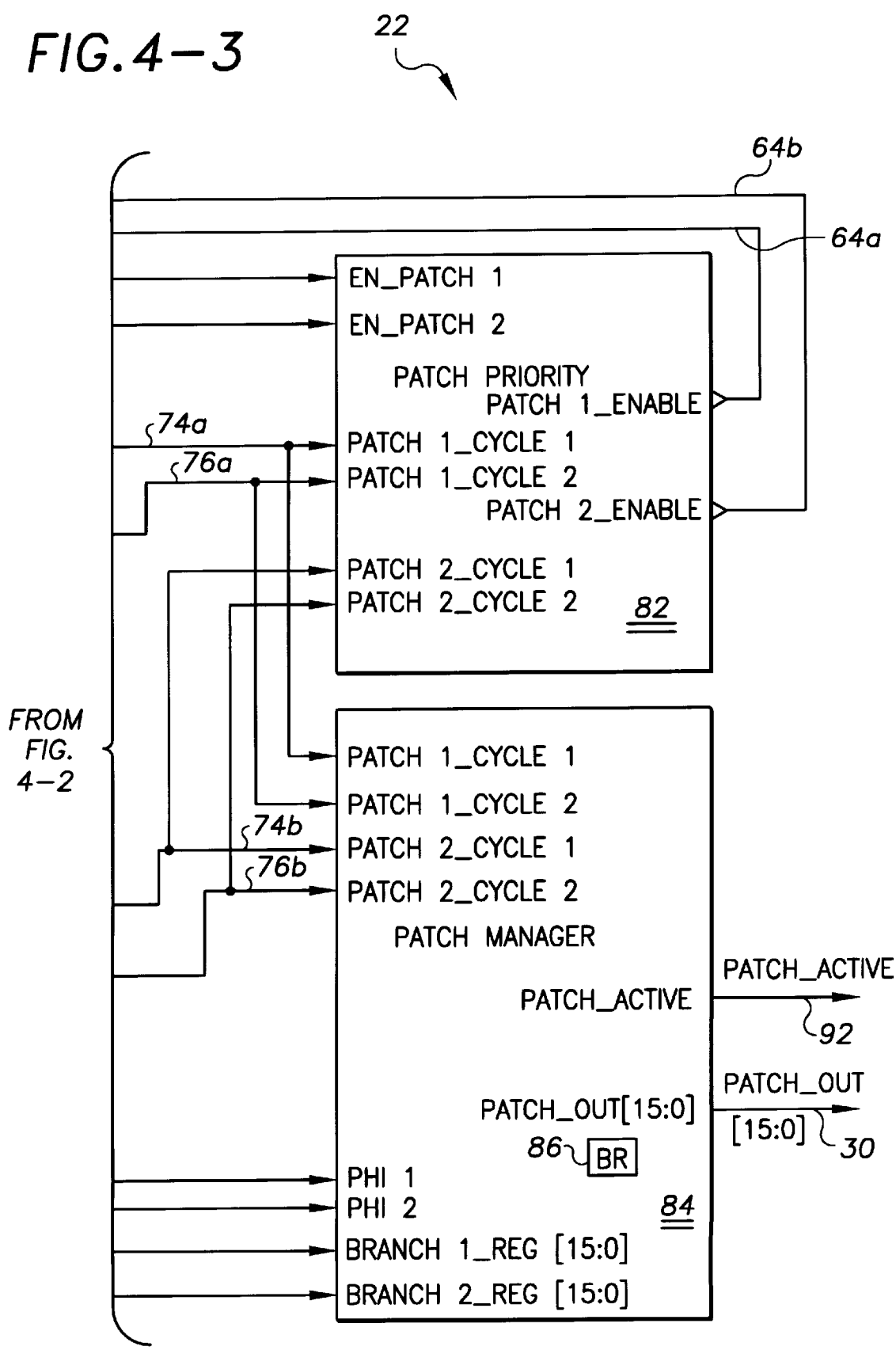
FIG. 3 is a simplified electrical schematic showing the internal component blocks forming one of the patch modules, as seen in FIG. 4.

Referring to FIG. 3, a simplified electrical schematic shows the internal component blocks forming a patch module 58. Note that FIG. 4 shows two patch modules 58a and 58b, and each of these patch modules 58a and 58b are the same as the patch module 58 of FIG. 3. The patching circuitry 22 includes one or more patch modules 58, and each patch module 58 includes a comparator 42 coupled to a corresponding patch control module 60. The block 42 labelled compare is actually a comparator 42 which is analogous to the comparator labelled 42 in FIG. 2. The comparator 42 in FIG. 3 has an input from the DSP 16 for the current DSP program address on bus 42. The comparator 42 also has a break address input from a break address register (not shown) on line 50. The comparator 42 detects a match between its two inputs and then supplies a signal indicating a match over line 62 to the patch control module 60.

The patch control module 60 has an enabling input over line 64 which comes from another part of the patching circuitry 22 (see block 82 in FIG. 4). Patch control module 60 also has inputs labelled phi1 and phi2 on lines 66 and 68, respectively, coming from the DSP 16. The signals phi 1 and phi 2 are merely clock signals of a type well known to those skilled in the art coming from the DSP 16. The signal labelled pprp is provided to the patch control module 60 over line 70 coming from the DSP 16. This signal, which is also well known to those skilled in the art, indicates that a read is being performed by the DSP 16. Additionally, the patch control module 60 has a reset input on line 72 which comes from a microcontroller (not shown) that is typically located off of the IC 12 in the area labelled 14 in FIG. 1. When the patch control module 60 is enabled over line 64, and the comparator 42 detects a match, the signal indicating a match over line 62 causes the patch control module 60 to initiate a patch sequence. Initiation of a patch sequence will render appropriate signals over the patch control outputs labelled patch_cycle 1 on line 74 and patch_cycle 2 on line 76. Details of patch sequence initiation will be discussed later with respect to device operation.

Referring now to FIG. 4, a simplified electrical schematic is shown of the internal component blocks forming the patching circuitry 22 of FIG. 1. Here the patching circuitry 22 is shown with two patch modules 58a and 58b, each like the patch module 58 in FIG. 3. This means that each of the patch modules 58a and 58b contain a comparator 42 and a patch control module 60 connected as shown in FIG. 3. Each comparator 42 within the patch modules 58a and 58b shares a common input bus 24 providing the current DSP program address. Also, each comparator 42 within the patch modules 58a and 58b has their own dedicated break address input 50a and 50b, respectively, corresponding to a separate flawed portion 18b of the ROM 18. Line 50a is coupled to a register (not shown) which has stored therein a break address corresponding to the beginning of a flawed portion such as 18b in ROM 18. Similarly, line 50b is coupled to another register (not shown) which has stored therein another break address corresponding to the beginning of another flawed portion like 18b in ROM 18. Obviously, this would mean that the ROM 18 as shown in FIG. 1 would have two or more flawed portions like the one shown and labelled as 18b. Moreover, each comparator 42 within the patch modules 58a and 58b has an output 62 coupled as an input to their corresponding patch control module such as 60 in FIG. 3. Each of the patch modules 58a and 58b also have as inputs the phi1, phi2, reset, and pprp signals provided, respectively, on lines 66, 68, 72, and 70, and these signals are provided from sources as previously discussed with respect to FIG. 3. Patch module 58a provides outputs patch_cycle 1 and patch_cycle 2 on lines 74a and 76a, respectively, while patch module 58b provides outputs patch_cycle 1 and patch_cycle 2 on lines 74b and 76b, respectively. Within each of the patch modules 58a and 58b, their respective patch control module (like 60 in FIG. 3) has its own patch enable input (like 64 in FIG. 3). The patch enable inputs are provided on lines 64a and 64b for patch modules 58a and 58b, respectively. The patch control module 60 within patch module 58a initiates a patch sequence when it is enabled via input 64a and its input 62 from its corresponding comparator 42 is asserted, and the patch control module 60 within patch module 58b initiates a patch sequence in a similar manner.

Still referring to FIG. 4, a patch priority module 82 is coupled to each output 74a and 76a of patch module 58a and to each output 74b and 76b of patch module 58b for controlling which patch module 58a or 58b is enabled. The specific manner or enabling will be discussed with respect to the operation of the device 12; however, note that the patch priority module 82 outputs enabling or disabling signals over lines 64a and 64b to patch modules 58a and 58b, respectively. Additionally, note that the patch priority module 82 has enable inputs labelled patch1_enablereg on line 78 and patch2_enablereg on line 80. Line 78 is coupled to a register (not shown) that has loaded therein enabling data, and line 80 is coupled to another register (also not shown) that has loaded therein enabling data.

Again referring to FIG. 4, a patch manager module 84 is coupled to each output 74a and 76a of patch module 58a and to each output 74b and 76b of patch module 58b. Patch manager module 84 also has a separate branch address input for each patch module 58a and 58b, therefore in this case, there are two branch address inputs labelled branch1_reg on line 88 and branch2_reg on line 90. Line 88 is coupled to a register (not shown) that has loaded therein an address corresponding to the beginning of a block of corrected DSP program software such as 20b stored in RAM 20. Similarly, line 90 is coupled to another register (also not shown) that has loaded therein another address corresponding to the beginning of another block of corrected DSP program software like 20b stored in RAM 20. Thus, in this example, there would be two or more flawed portions of DSP program software like 18b stored in ROM 18, and two or more corrected portions of DSP program software like 20b in RAM 20. The patch manager module 84 also has inputs signals phi1 and phi2 on lines 66 and 68, respectively, to provide DSP clock signals. Additionally, the patch manager module 84 is shown with an internal block labelled Br 86, which represents the situation wherein a branch op code is hard coded into the patch manager module 84. Lastly, the patch manager module 84 has an output labelled patch_out on bus 30 for providing data to the DSP 16, and another output labelled patch_active on line 92 which indicates that a patch is in progress.

Lastly, it should be pointed out that operations carried out by the individual modules comprising the patching circuitry 22 such as the patch modules 58a and 58b (and their internal logical blocks 42 and 60), the patch priority module 82, and the patch manager module 84 can be established in any one of a number of different combinations of electronic elements and logic well known to those skilled in the art.

OPERATION

Before beginning with the detailed discussion of the operation of the device 12, it is important to note that this invention permits the DSP 16 to run at its full speed without having its program flow substantially interrupted in order to execute corrected DSP program software. Rather, the correction is done in real time and without any significant latency (i.e., the DSP 16 program counter is not delayed in order to execute the corrected DSP program software). Moreover, the invention here permits as many corrections to the DSP program software as there are flaws in the IC's ROM 18, and quite importantly, these corrections to the software can be implemented in a final production device 12 with internal flaws in its embedded ROM 18, thereby obviating the need to design and manufacture a new chip.

In general, there are three phases of operation for device 12. In particular, in one phase of operation, the DSP 16 receives its software program from the ROM 18 such as from section 18a thereof because that section of ROM 18 contains flawless software. In a second phase of DSP operation, a match is detected between the current DSP program address and a break address corresponding to the beginning of flawed DSP program software in the ROM 18 such as at section 18b thereof. At this stage, the patching circuitry 22 sends to the DSP 16 a branch op code followed by a branch address corresponding to the beginning of a block of corrected DSP program software in the RAM 20 such as in section 20b thereof. Therefore, in the third general phase of device operation, the DSP 16 fetches corrected DSP program software instructions from the RAM 20 such as section 20b thereof. Moreover, corrected DSP program software can be set up to cause the DSP 16 to establish new break and branch addresses, thereby setting up additional patches to be executed during the operation of the device's DSP 16. Also, a section of corrected DSP program software typically includes, at the end thereof, jumping instructions causing the DSP 16 to recommence fetching DSP program software from the ROM 18 in a section such as 18c located downstream of the previous flawed portion 18b in the ROM 18.

With reference to FIG. 4, before the device 12 operates, certain registers (not shown for the sake of clarity of presentation) must be set up for operation of the device 12. In the preferred embodiment, these registers are located on IC chip 12. Typically, these registers will be set by a controller in a manner well known to those skilled in the art. Such a controller could be a microcontroller located off chip in area 14. Alternatively, those skilled in the art also recognize that the DSP 16 itself can be used to rewrite certain, if not all, of these registers. Here, the phrase, "these registers," includes two registers, one providing enabling data for line 78 labelled patch1_enablereg, and another providing enabling data for line 80 labelled patch2_enablereg. These registers are typically not set by the DSP 16, although those skilled in the art recognize that they could be set by the DSP 16. Rather, these two registers are generally set only by a microcontroller or microprocessor located in the off chip area 14; however, other equivalent manners well known to those skilled in the art are permitted. In general, note that there would be a number of enabling registers and corresponding input lines such as 78 and 80 equal in number to the number of patch modules 58a and 58b in the device 12.

The phrase, "these registers," also includes as many break and branch registers as there are patch modules 58a and 58b, in the device 12—here that number is two. Accordingly, there would be one register providing line 50a labelled break1_reg with an address corresponding to the beginning of a block of flawed DSP programs software in a section of ROM 18 such as 18b, and there would also be another register providing line 50b labelled break2_reg with an address corresponding to the beginning of another block of flawed DSP programs software in a section of ROM 18 like 18b. Note that either of these break registers could be set by either a microcontroller located off chip in area 14 or by the DSP 16. Moreover, note that either of these break registers can be rewritten, and therefore, used more than once.

It's already been said that the phrase, "these registers," also includes as many break and branch registers as there are patch modules 58a and 58b in the device 12, and here that number is two. Thus, there would be one register providing line 88 labelled branch1_reg with an address corresponding to the beginning of a block of corrected DSP program software in a section of RAM 20 such as 20b, and there would also be another register providing line 90 labelled branch2_reg with an address corresponding to the beginning of another block of corrected DSP program software in a section of RAM 20 like 20b. Note that either of these branch registers could be set by either a microcontroller located off chip in area 14 or by the DSP 16. Moreover, note that either of these branch registers can be rewritten, and therefore, used more than once. In other words, once a patch sequence has been initiated in order to bypass a flawed portion of DSP program software stored in ROM 18 at a section thereof such as 18b, another patch sequence can be set up to correct for any additional DSP program software flaws in the ROM 18, and setting up additional patch sequences involves setting a new break address and a corresponding new branch address in their respective registers. The changes to these registers can be accomplished by a microcontroller located off chip in area 14, or alternatively, it can be done by the DSP 16 itself by including in the currently executing corrected DSP program software from RAM 20 appropriate DSP instructions well known to those skilled in the art.

A hypothetical example of the operation of the device 12 now follows to further explain its operation. In this example, it is assumed that there are two distinct areas in ROM 18 that each have flawed DSP program software like the single section of flawed DSP program software 18b in FIG. 1. Note however, that device 12 could be implemented with a ROM 18 having less or more than two areas of flawed DSP program software, and that the device 12 would work analogously to the manner of operation described herein.

Before the device 12 can accomplish the patching of corrected for flawed DSP program software, certain preliminary actions must occur. For example, the enabling of the patching circuitry 22 must occur. Enabling is permitted by a microcontroller (not shown) located in an area such as 14 outside of the IC 12 but still considered part of the system 10. In the preferred embodiment, a microcontroller writes a bit to a register for each patch module 58a and/or 58b which is to be enabled. In this example, two bits (i.e., one per register) will be set in order to enable both patch modules 58a and 58b. When these bits are set, their respective lines patch1_enablereg 78 and patch2_enablereg 80 indicate to the patch priority module 82 which of the patch modules 58a and/or 58b are to be enabled. In response, the patch priority module 82 enables the appropriate patch modules, which in this case is both 58a and 58b, via lines 64a and 64b, respectively. When the patch priority module 82 detects the situation where the two patch modules 58a and 58b will start running at the same time, or the situation where one of the patch modules 58a or 58b is to begin a patch sequence while the other's patch is still being executed by the DSP 16, then the patch priority module 82 will send a disable signal over one of the enabling lines 64a or 64b in order to avoid a patching conflict. This operation will be discussed in more detail later. Note however that here two enabling bits are set only for the purpose of this example, because if there were more or less patch modules like 58a and 58b to be enabled, then there would be a corresponding number of enabling bits set (i.e., the number of enabled patch modules such as 58a and 58b equals the number of enabling bits set). Moreover, the use of enabling bits set by a microcontroller has been shown; however, those skilled in the art recognize that there are many different manners of enabling blocks such as the patch modules 58a and 58b, and such other well known manners may be implemented, if desired.

Recall that the patch manager module 84 has an internal block labelled Br 86 which represents the branch op code being hard coded into the patch manager module 84. The branch op code is used in the patching sequence. Since this op code is hard coded into the patch manager module 84, there is no register needing to be written to with the branch op code; however, those skilled in the art recognize that one could, if desired, accomplish the patching sequence of device 12 by accessing a branch op code through other means than through hard coding the instruction into the patch manager module 84. Moreover, those skilled in the art also recognize that there are a multitude of ways similar to implementing the branch op code in order to jump from one address to another, and if desired, those alternative jumping techniques could be used.

In order to perform in this example two patches, two break and branch addresses must be set. More generally, for each new patching sequence to be performed by device 12, a new break and branch address needs to be set. In our example, in order to set two break addresses, there are two registers which are set with the two break addresses wherein each break address corresponds to the beginning of a separate flawed portion of ROM 18, each like section 18b thereof. It will become apparent upon later discussion that two or more patches can be implemented with a single patch module like 58a or 58b, a single break address input like 50a or 50b, and a single branch address input like 88 or 90. In such a case, the break and branch address inputs, like for example 50a and 88 respectively, are each written to with new break and branch addresses for each new patching sequence. Basically, this is done by including, in the corrected DSP program software, instructions directing the DSP 16 to write new break and branch addresses into their respective registers, and in this manner, multiple patches can be accomplished with device 12 without the need for more than one patch module like 58a, one break address input like 50a, and one branch address input like 88.

Nonetheless, proceeding with a hypothetical exemplified by FIG. 4, there are two patch modules 58a and 58b, two break address inputs 50a and 50b, and two branch address inputs 88 and 90. In this example, the two break address input registers are each set with a different break address input corresponding to two different flawed portions of the ROM 18, each like the flawed portion 18b. These two registers may be set with their break addresses by a microcontroller. Alternatively, one register may be set with a first break address by the microcontroller, and then the other break address register may be set with the second break address, during execution of the first patch, by the DSP 16.

In a similar manner, two branch address input registers are each set with a different branch address input corresponding to two different corrected portions of the RAM 20, each like the corrected portion 20b. These two registers may be set with their branch addresses by a microcontroller. Alternatively, one register may be set with a first branch address by the microcontroller, and then the other branch address register may be set with the second branch address, during execution of the first patch, by the DSP 16.

The DSP 16 can set break and branch address registers in the following manner. The microcontroller sets the initial break and branch addresses in their respective registers. These addresses corresponds to the beginning of a flawed portion of DSP program software stored in ROM 18, and the beginning of a corrected portion of DSP program software stored in RAM 20. Once the first patch is initiated, and the corrected portion of DSP program software is being executed by the DSP 16, that corrected code can include instructions directing the DSP 16 to load new break and branch addresses into their appropriate registers. At the end of the execution of the first block of corrected code, instructions are provided therein which cause the DSP program counter to return to the ROM 18 at a location downstream of the flawed portion thereof, thereby continuing with that portion of ROM 18 containing acceptable DSP program software. Once the second break address is detected and a patch to the second body of corrected DSP program software is accomplished, the second section of corrected DSP program software can include instructions directing the DSP 16 to load new break and branch addresses into their respective registers, thereby permitting a third patch. In this manner, multiple patches can be executed by causing the DSP 16 to rewrite the break and branch addresses. Alternatively, corrected DSP program software could include instructions causing the microcontroller to rewrite the break and branch registers. In either case, or via a combination of the two, multiple patches can be executed by device 12 using one or more patch modules like 58a, one or more break address inputs like 50a, and one or more branch address inputs like 88.

In order to correct the flawed DSP program software stored in ROM 18, it is first necessary to download corrected DSP program software into the RAM 20. Initially, the device 12 is reset pursuant to what is referred to in the art as a global reset. Next, the microcontroller from area 14 makes a request of the DSP 16 to access what is referred to in the art as shared RAM. This is a portion of RAM which is not shown and which is accessible by both the DSP 16 and the microcontroller; however, by default, after a global reset, only the DSP 16 can access it. When the DSP 16 receives the request, it grants the microcontroller access to the shared RAM. The microcontroller then writes all of the required corrected code (i.e., the corrected DSP program software) into the shared RAM and specifies to the DSP 16 at which location it should copy the corrected code into the RAM 20 and the size of the block or blocks of corrected code. Then, the microcontroller indicates to the DSP 16 that it is finished with the shared RAM, and gives control of it back to the DSP 16. The DSP 16 next copies the corrected code from the shared RAM into the program RAM 20 at the location specified by the microcontroller. It should be pointed out that multiple blocks of corrected code may be loaded into the RAM 20 in this manner. Next, the microcontroller will set the two patch enable register bits, as previously discussed. It will also set the appropriate break and branch addresses into their respective registers, as previously discussed. Then, a special reset is performed which resets the IC 12 except for the aforementioned registers. Then, the IC 12 will start operation from the beginning of its code in ROM 18, and will operate according to that code until a patch occurs, thereby substituting corrected code for the flawed code each time that flawed code is detected.

Once device 12 is up and operating, the DSP 16 begins execution of the program software in the ROM 18; however while this is occurring the patching circuitry 22 is monitoring the current DSP program address on line 24 to see if there is a match between it and a break address on either of lines 50a or 50b. It should also be pointed out that the patch modules 58a and 58b are both enabled via their respective enable inputs on lines 64a and 64b. Until a match is detected, the DSP 16 receives its instructions from a portion of the ROM 18 having untainted DSP program software such as section 18a.

A match may be detected by either of the patch modules 58a or 58b. In particular, assume patch module 58a detects a match. This means that patch module 58a's internal comparator 42 (see FIG. 3) has detected a match between its DSP program address input on line 24 and its break address input on line 50a. In response and with reference to FIGS. 3 and 4, the comparator 42 outputs a signal on line 62 indicating a match to patch control module 60, which is enabled on line 64a. At this stage, the patch control module 60 internal to patch module 58a initiates a patch sequence on its output lines 74a and 76a. Patch module 58a, like patch module 58b or any other patch module that would be required, is really a sequencer that indicates at what time certain data associated with the patch manager module 84 should be output to the DSP 16 on bus 30. In particular, the "certain data" refers to the branch op code 86 hard coded in the patch manager module 84, and to any one of the branch addresses input to the patch manager module 84 on lines 88 or 90.

Referring to the output signals of patch module 58a, the signal patch_cycle1 on line 74a provides to the patch manager module 84 the precise time at which the branch op code 86 should be output to the DSP 16 on bus 30. Additionally, the signal patch_cycle2 on line 76a provides to the patch manager module 84 the precise time at which the appropriate branch address on either line 88 or 90 should be output to the DSP 16 on bus 30. What constitutes the "appropriate" branch address is that address corresponding to the corrected DSP program software in RAM 20 which is to be substituted for the flawed portion of ROM 18 flagged by the break address triggering the patch sequence.

The various possible statuses for a patch module such as patch modules 58a or 58b are as follows. Note that patch modules 58a and 58b operate in substantially the same way. In the case where there is no match detected by patch module 58a, obviously there is no patch sequence initiated by patch module 58a. Here, outputs patch_cycle1 on line 74a and patch_cycle2 on 76a are both inactive, resulting in no patching sequence by the patch manager module 84. In the next case, when a match is detected by the comparator 42 of patch module 58a, patch_cycle1 on line 74a is first activated, while patch_cycle2 on line 76a is inactive. This state of the patch sequence initiated by patch module 58a causes the hard coded branch op code 86 in the patch manager module 84 to be output to the DSP 16 on bus 30. Next, the patch_cycle1 signal on line 74a is inactive, while the patch_cycle2 signal on line 76a is activated which results in the appropriate branch address, say for example on line 88, being output to the DSP 16 on bus 30. Again, what constitutes the "appropriate" branch address is that address corresponding to the corrected DSP program software in RAM 20 which is to be substituted for the flawed portion of ROM 18 flagged by the break address triggering the patch sequence. The combination of putting the branch op code 86 followed by the appropriate branch address out onto the DSP instruction bus 30, causes the DSP 16 to obtain its program software code from the corrected portion of code in RAM 20, in place of the corresponding flawed portion in ROM 18. After, the branch op code followed by the appropriate branch address is put out onto the DSP instruction bus 30, the signals patch_cycle1 on line 74a and patch_cycle2 on line 76a will be inactive, thereby ending the initiation of this particular patch sequence. Note that line 92 labelled patch_active provides a signal indicating that initiation of a patch sequence is in progress (i.e., during the time that the branch op code 86 and the branch address is output onto the DSP instruction bus 30). The patch_active signal on line 92 is generally used to inform on chip logic that a patch sequence is in progress.

The initiation of this particular patch sequence is over; however, the result of its initiation continues in that the DSP 16 at this point is now operating with program software instructions coming from the RAM 20. This corrected, patched DSP program software can, if desired and as mentioned before, change the break and branch address registers corresponding to patch module 58a and/or 58b. At the end of the execution of this corrected, patched DSP program software code, a jumping type instruction causes the current DSP program address counter on bus 24 to point to the beginning of untainted DSP program software located in ROM 18 downstream of the last flawed portion of ROM 18 which was bypassed. Then, the DSP 16 operates with flawless instructions provided by ROM 18 until another break address, if any, is reached, thereby triggering a second patch sequence. This process continues for as many break and branch address pairs required by device 12 in order to patch around or bypass flawed portions of DSP program software in ROM 18.

The patch priority module 82 operates in conjunction with the patching process mentioned above. In particular, the patch priority module 82 analyzes the outputs of every patch module 58a and 58b. The patch priority module 82 can disable one of the patch modules 58a or 58b via lines 64a or 64b, respectively, depending upon the operational state of the patch modules 58a and 58b, thereby avoiding conflicting patch module operation. Note also that more than one patch module could be disabled by the patch priority module 82 if for example there were three or more, instead of two patch modules like 58a and 58b. To facilitate a better understanding of the operation of the patch priority module 82, consider the following example. Imagine that the two patch modules 58a and 58b are both enabled via their respective input enabling lines 64a and 64b. Further assume that patch module 58a has detected a match between the current DSP program address on line 24 and the break address on line 50a, and is therefore in the process of initiating a patch sequence. More particularly, assume that patch module 58a's output patch_cycle2 on line 76a is active in order to place branch address on line 88 out onto the DSP instruction bus 30. In the meantime, assume that patch module 58b has also detected a match between the current DSP program address on line 24 and the break address on line 50b, and is therefore also in the process of initiating a patch sequence. First, patch module 58b's output patch_cycle1 on line 74b tries to force the patch manager module 84 to output the hard coded branch op code 86 onto the DSP instruction bus 30. However, the patch priority module 82 will prevent this by detecting the situation, namely that patch module 58b is trying to over-write patch module 58a's patch sequence. As a result, the patch priority module 82 will disable patch module 58b via line 64b. Then, when patch module 58a's patch sequence is complete, the patch priority module 82 will re-enable patch module 58b over line 64b in order to permit the second patch sequence to begin.

If a user properly sets the break address registers, there will not be an attempt of one patch module to over-write another patch module's patch sequence. There are however at least two instances where, through user or some other error, intervention of the patch priority module 82 would be required. In particular, in one case, one or more patch modules like 58a and 58b simultaneously attempt to initiate a patch sequence. In another case, one patch module, say for example 58a, is already in the middle of executing a patch sequence, while another patch module like 58b attempts to initiate its own patch sequence. In either case, the patch priority module 82 will, as discussed above, prevent a second patch sequence from over-writing a first patch sequence.

Although the invention has been particularly shown and described with reference to a preferred embodiment thereof, it will be understood by those skilled in the art that changes in form and detail may be made therein without departing from the spirit and scope of the invention. For example, the code of interest discussed thus far has been DSP program software or instructional/data type code; however, those skilled in the art will recognize that if it were desired, the device 12 could be implemented to patch other types of corrected code stored in embedded RAM 20 for flawed versions of such code stored in embedded ROM 18. For the sake of attempting to establish absolute clarity regarding the invention, it should again be pointed out that FIG. 4 represents one possible example of the device 12. In particular, the device 12 can include one, two, three, or more patch modules like the ones 58a and 58b shown. Whatever the number of patch modules like 58a and 58b used, there would be a number of break registers, branch registers, and enabling registers equal to the number of patch modules; however, there would only be one each of the patch manager 84 and patch priority 82 modules.

What is claimed is:

1. An Integrated Circuit (IC) device comprising, in combination:

an IC including an embedded Digital Signal Processor (DSP), an embedded Random Access Memory (RAM), and an embedded Read Only Memory (ROM) having at least one portion thereof which is flawed;

patching circuitry embedded in said IC, the patching circuitry including a plurality of patch modules, each patch module arranged to receive as input signals a current DSP program address and respective break addresses and arranged to generate an output signal at an output terminal when the current program address matches the respective break address, wherein each break address corresponds to a separate flawed portion of said embedded ROM, the patching circuitry further including a patch priority circuit coupled to output terminals of the patch modules, the priority circuit configured and arranged to selectively enable the patch modules one after another in a priority order.

2. The IC device of claim 1 wherein each patch module includes a comparator coupled to a corresponding patch control module.

3. The IC device of claim 2 wherein each comparator shares a common input line providing said current DSP program address, each comparator has their own dedicated break address input corresponding to a separate flawed portion of said embedded ROM, and each comparator has an output coupled as an input to said corresponding patch control module.

4. The IC device of claim 3 wherein a comparator's output will assert when said comparator's break address input matches said current DSP program address input.

5. The IC device of claim 4 wherein each patch control module has its own patch enable input.

6. The IC device of claim 5 wherein a patch control module initiates a patch sequence when said patch control module is enabled and its input from its corresponding comparator is asserted.

7. The IC device of claim 6 further including a patch manager module coupled to each output of each patch module and having a separate branch address input for each patch module.

8. The IC device of claim 7 wherein each branch address input provides to said patch manager module an address corresponding to a location in said embedded RAM which is a starting point of a block of corrected software for use by said embedded DSP in place of flawed software stored in a flawed portion of said embedded ROM.

9. The IC device of claim 7 wherein said patch manager module outputs a branch op code followed by a branch address to said DSP in response to a patch control module initiating said patch sequence, said branch address coming from a branch address input corresponding to an enabled patch module.

10. A method of operating an Integrated Circuit (IC) device comprising the steps of:

providing an IC including an embedded Digital Signal Processor (DSP), an embedded Random Access Memory (RAM), and an embedded Read Only Memory (ROM) having at least one portion thereof which is flawed;

providing patching circuitry embedded in said IC with a plurality of patch modules, each patch module arranged to receive as input signals a current DSP program address and respective break addresses, wherein each break address corresponds to a separate flawed portion of said embedded ROM;

generating an output signal at an output terminal of a patch module when the current program address matches the respective break address; and selectively enabling the patch modules one after another in a priority order responsive to input priority signals.

11. The method of claim 10 further comprising the steps of:

supplying data stored in said embedded ROM to said embedded DSP until detection of said match; and providing a branch op code followed by a branch address to said embedded DSP in response to said detection of said match, wherein said branch address corresponds to a location in said embedded RAM which is a starting point of a block of corrected software for use by said embedded DSP in place of flawed software stored in a flawed portion of said embedded ROM.

12. The method of claim 11 further comprising the steps of:

supplying said corrected software to said embedded DSP after said step of providing a branch op code followed by a branch address to said embedded DSP; and supplying data to said embedded DSP from a portion of said embedded ROM located downstream of said flawed portion thereof after said step of supplying corrected software to said embedded DSP.

13. The method of claim 12 wherein the step of supplying data to said embedded DSP from said portion of said embedded ROM located downstream of said flawed portion thereof comprises the additional step of providing at the end of said corrected software a jump op code followed by an address to jump to corresponding to said portion in said embedded ROM located downstream of said flawed portion thereof.

14. The method of claim 12 further comprising the step of changing said break and branch addresses after said step of supplying said corrected software, wherein a new break address corresponds to a starting location of another flawed portion of said embedded ROM and a new branch address corresponds to location in said embedded RAM where a block of corrected software begins to be used by said embedded DSP in place of said another flawed portion of said embedded ROM, thereby permitting a plurality of substitutions of corrected software for a plurality of flawed portions in said embedded ROM.

15. The method of claim 14 wherein the step of changing said break and branch addresses is performed by a portion of said device which includes said IC, said portion being outside of said IC.

16. The method of claim 14 wherein the step of changing said break and branch addresses comprises the additional step of providing said corrected software with instructions directing said embedded DSP to change said break and branch addresses.

17. An Integrated Circuit (IC) device comprising, in combination:

an IC including an embedded Digital Signal Processor (DSP), an embedded Random Access Memory (RAM), and an embedded Read Only Memory (ROM) having at least one portion thereof which is flawed; and patching circuitry embedded in said IC and configured and arranged to receive as input signals a current DSP program address and at least one break address wherein each break address corresponds to a separate flawed portion of said embedded ROM;

said patching circuitry including a plurality of patch modules;

wherein each patch module includes a comparator coupled to a corresponding patch control module;

wherein each comparator shares a common input line providing said current DSP program address, each comparator has their own dedicated break address input corresponding to a separate flawed portion of said embedded ROM, and each comparator has an output terminal coupled to an input terminal of said corresponding patch control module;

wherein a comparator's output will assert when said comparator's break address input matches said current DSP program address input;

wherein each patch control module has its own patch enable input;

wherein a patch control module initiates a patch sequence when said patch control module is enabled and its input from its corresponding comparator is asserted;

said IC device further including a patch priority circuit coupled to output terminals of the patch modules, the priority circuit configured and arranged to selectively enable the patch modules one after another in a priority order for controlling which patch module is enabled;

said IC device also including a patch manager module coupled to each output of each patch module and having a separate branch address input for each patch module;

wherein each branch address input provides to said patch manager module an address corresponding to a location in said embedded RAM which is a starting point of a block of correctd software for use by said embedded DSP in place of flawed software stored in a flawed poriton of said embedded ROM; and wherein said patch manager module outputs a branch op code followed by a branch address to said DSP in response to a patch control module initiating said patch sequence, said branch address coming from a branch address input corresponding to an enabled patch module.

* * * * *

UNITED STATES PATENT AND TRADEMARK OFFICE
CERTIFICATE OF CORRECTION

PATENT NO. : 6,158,018
DATED : December 5, 2000
INVENTOR(S) : Bernasconi et al.

It is certified that error appears in the above-identified patent and that said Letters Patent is hereby corrected as shown below:

<u>Title page,</u>
Item [54], the title should read -- INTEGRATED CIRCUIT INCLUDING PATCHING CIRCUITRY TO BYPASS PORTIONS OF AN INTERNALLY FLAWED READ ONLY MEMORY AND A METHOD THEREFOR --.

<u>Column 1,</u>
Line 5, "THEREFORE" should read -- THEREFOR --.

<u>Column 18,</u>
Line 44, "correctd" should read -- corrected --.

Signed and Sealed this

Thirtieth Day of April, 2002

Attest:

Attesting Officer

JAMES E. ROGAN
*Director of the United States Patent and Trademark Office*